(12) United States Patent
Hayes et al.

(10) Patent No.: US 11,899,607 B2
(45) Date of Patent: Feb. 13, 2024

(54) SENDING A REQUEST TO AGENTS COUPLED TO AN INTERCONNECT

(71) Applicant: Arm Limited, Cambridge (GB)

(72) Inventors: Timothy Hayes, Cambridge (GB); Alejandro Rico Carro, Austin, TX (US); Tushar P. Ringe, Austin, TX (US); Kishore Kumar Jagadeesha, Austin, TX (US)

(73) Assignee: Arm Limited, Cambridge (GB)

( * ) Notice: Subject to any disclaimer, the term of this patent is extended or adjusted under 35 U.S.C. 154(b) by 165 days.

(21) Appl. No.: 17/335,378

(22) Filed: Jun. 1, 2021

(65) Prior Publication Data

US 2022/0382703 A1     Dec. 1, 2022

(51) Int. Cl.
  *G06F 13/40*     (2006.01)
  *G06F 12/0875*   (2016.01)

(52) U.S. Cl.
  CPC ...... *G06F 13/4031* (2013.01); *G06F 12/0875* (2013.01); *G06F 2212/1024* (2013.01)

(58) Field of Classification Search
  CPC ............ G06F 13/4031; G06F 12/0875; G06F 2212/1024
  See application file for complete search history.

(56) References Cited

U.S. PATENT DOCUMENTS

| | | | | |
|---|---|---|---|---|
| 9,497,135 B2* | 11/2016 | Sung | ...................... | H04L 47/28 |
| 2008/0294820 A1* | 11/2008 | Croxford | ............ | G06F 13/4018 |
| | | | | 710/105 |
| 2009/0287865 A1* | 11/2009 | Aldworth | ............ | G06F 13/1626 |
| | | | | 710/110 |
| 2011/0019668 A1* | 1/2011 | Diab | ...................... | H04L 49/90 |
| | | | | 370/389 |
| 2014/0201447 A1* | 7/2014 | Grandou | ............. | G06F 12/0804 |
| | | | | 711/122 |
| 2015/0199290 A1* | 7/2015 | Mathewson | .......... | G06F 13/364 |
| | | | | 710/110 |
| 2017/0060633 A1* | 3/2017 | Suarez Gracia | .... | G06F 11/3433 |
| 2020/0401545 A1* | 12/2020 | Shiraishi | ............. | G06F 13/4031 |

\* cited by examiner

*Primary Examiner* — Phong H Dang
(74) *Attorney, Agent, or Firm* — NIXON & VANDERHYE P.C.

(57) ABSTRACT

An apparatus comprises an interconnect providing communication paths between agents coupled to the interconnect. A coordination agent is provided which performs an operation requiring sending a request to each of a plurality of target agents, and receiving a response from each of the target agents, the operation being unable to complete until the response has been received from each of the target agents. Storage circuitry is provided which is accessible to the coordination agent and configured to store, for each agent that the coordination agent may communicate with via the interconnect, a latency indication for communication between that agent and the coordination agent. The coordination agent is configured, prior to performing the operation, to determine a sending order in which to send the request to each of the target agents, the sending order being determined in dependence on the latency indication for each of the target agents.

17 Claims, 9 Drawing Sheets

| time | MN | requests | responses |
|---|---|---|---|
| 0 | generates req0 | | |
| 1 | generates req1 | | |
| 2 | generates req2 | | |
| 3 | generates req3 | RNF0 receives req0, RNF1 receives req1 | |
| 4 | generates req4 | | RNF0 sends resp0, RNF1 sends resp1 |
| 5 | | | |
| 6 | receives resp1 | | |
| 7 | receives resp0 | RNF2 receives req 2 | |
| 8 | | | RNF2 sends resp2 |
| 9 | | | |
| 10 | | | |
| 11 | | RNF3 receives req3, RNF4 receives req4 | |
| 12 | | | RNF3 sends resp3, RNF4 sends resp4 |
| 13 | receives resp2 | | |
| 14 | | | |
| 15 | | | |
| 16 | | | |
| 17 | | | |
| 18 | | | |
| 19 | receives resp4 | | |
| 20 | receives resp3 | | |
| 21 | operation complete | | |

FIG. 3

| time | MN | requests | responses |
|---|---|---|---|
| 0 | generates req3 | | |
| 1 | generates req4 | | |
| 2 | generates req2 | | |
| 3 | generates req0 | | |
| 4 | generates req1 | | |
| 5 | | | |
| 6 | | RNF0 receives req0, RNF1 receives req1 | |
| 7 | | RNF2 receives req2 | RNF0 sends resp0, RNF1 sends resp1 |
| 8 | | RNF3 receives req3, RNF4 receives req4 | RNF2 sends resp2 |
| 9 | receives resp1 | | RNF3 sends resp3, RNF4 sends resp4 |
| 10 | receives resp0 | | |
| 11 | | | |
| 12 | | | |
| 13 | receives resp2 | | |
| 14 | | | |
| 15 | | | |
| 16 | receives resp4 | | |
| 17 | receives resp3 | | |
| 18 | operation complete | | |

FIG. 4

SENDING A REQUEST TO AGENTS COUPLED TO AN INTERCONNECT

BACKGROUND

The present technique relates to the field of data processing.

In a data processing system, several agents may communicate with each other via communication paths provided by an interconnect. For each pair of agents which can communicate with one another, there may be a latency (e.g. delay or duration) associated with that communication.

SUMMARY

Viewed from one example, the present technique provides an apparatus comprising:
an interconnect to provide communication paths between agents coupled to the interconnect;
a coordination agent coupled to the interconnect and configured to perform an operation that requires sending a request to each of a plurality of target agents selected for the operation from the agents coupled to the interconnect, and receiving a response from each of the plurality of target agents, the operation being unable to complete until the response has been received from each of the plurality of target agents; and
storage circuitry accessible to the coordination agent and configured to store, for each agent that the coordination agent may communicate with via the interconnect, a latency indication for communication between that agent and the coordination agent;
wherein the coordination agent is configured, prior to performing the operation, to determine a sending order in which to send the request to each of the plurality of target agents, the sending order being determined in dependence on the latency indication for each of the plurality of target agents.

Viewed from another example, the present technique provides a method comprising:
performing an operation that requires a coordination agent to send a request to each of a plurality of target agents selected for the operation from agents coupled to an interconnect, and receiving a response from each of the plurality of target agents, the operation being unable to complete until the response has been received from each of the plurality of target agents, and the interconnect providing communication paths between the agents coupled to the interconnect;
storing, for each agent that the coordination agent may communicate with via the interconnect, a latency indication for communication between that agent and the coordination agent; and
prior to performing the operation, determining a sending order in which to send the request to each of the plurality of target agents, the sending order being determined in dependence on the latency indication for each of the plurality of target agents.

Further aspects, features and advantages of the present technique will be apparent from the following description of examples, which is to be read in conjunction with the accompanying drawings.

BRIEF DESCRIPTION OF THE DRAWINGS

FIGS. 3 and 4 are timing diagrams illustrating example timings for an operation performed by a coordination agent;

DESCRIPTION OF EXAMPLES

Figure 1:
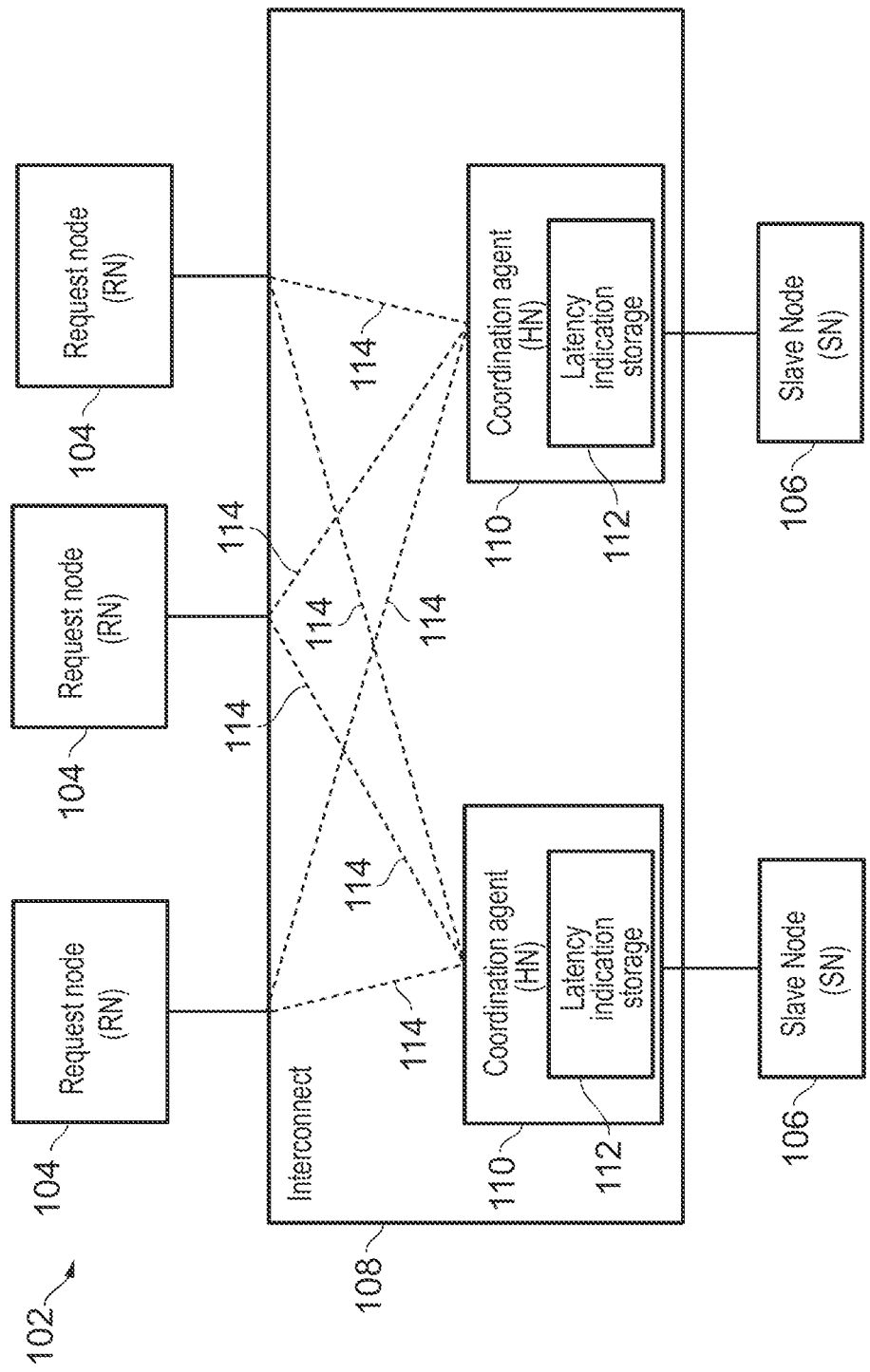
FIG. 1 schematically illustrates an example of a system comprising a plurality of agents coupled to an interconnect.

Before discussing example implementations with reference to the accompanying figures, the following description of example implementations and associated advantages is provided.

In some example configurations, there is provided an interconnect to provide communication paths between agents coupled to the interconnect, at least one of the agents comprising a coordination agent. Each agent can be connected directly to the interconnect, or coupled to the interconnect via one or more intermediary components. Each of the agents can be any component capable of sending or receiving requests; for example, the agents could include processing units such as a central processing unit (CPU) or graphics processing unit (GPU), memory or other storage structures and/or their associated control circuitry, and various input/output devices (which may, for example, be controlled by requests issued by a CPU or GPU). Requests and responses sent between the agents coupled to the interconnect (e.g. via the communication paths) can be non-blocking (e.g. there can be multiple requests in flight through the interconnect at any given time). The interconnect may, in some examples, be an "on-chip" interconnect, providing communication paths between components within a system-on-chip (SoC); the interconnect could additionally (or alternatively) provide communication paths between components on different chips.

As discussed above, there may be a latency associated with communication between the agents coupled to the interconnect. This latency may have an impact on the performance of the apparatus as a whole, and in particular, the inventors realised that the effect of this latency may be particularly apparent in situations where an operation cannot complete until requests have been sent and responses have been received from multiple other agents. For example, the apparatus of the present technique comprises a coordination agent coupled to the interconnect and configured to perform an operation that requires sending a request to each of a plurality of target agents selected for the operation from the agents coupled to the interconnect, and receiving a response from each of the plurality of target agents, the operation being unable to complete until the response has been received from each of the plurality of target agents.

The operation as a whole has an associated latency—indicative of the time it takes to complete the operation—and in this case, since the operation cannot complete until the response is received from each of the target agents, the overall latency of the operation depends (in part) on the latency associated with the sending of each request and the receiving of each response. Moreover, since the operation cannot complete until all of the responses have been received, the overall latency of the operation can impact the performance of the apparatus as a whole, especially if the apparatus requires the operation to complete before some other operation can be carried out.

However, the inventors realised that the overall latency of the operation can be reduced by implementing the present technique. In particular, storage circuitry is provided which is accessible to the coordination agent and which is configured to store, for each agent with which the coordination agent is capable of communicating, a latency indication for communication between that agent and the coordination agent. The storage circuitry may, for example, form part of the coordination agent, but could instead be a separate structure which is accessible to the coordination agent. The latency indication for each agent can be any value indicative of a degree of latency associated with communication between the coordination agent and that agent; for example, the latency indication could indicate an expected number of cycles of latency for communication along the communication path between that agent and the coordination agent in one or both directions, or it could indicate a ranking of each agent based on the latency of the communication.

The coordination agent is configured, prior to performing the operation, to determine a sending order in which to send the request to each of the plurality of target agents. The sending order is determined by the coordination agent in dependence on the latency indication recorded in the storage circuitry for each of the plurality of target agents. By determining a sending order based on the latency indication for each of the target agents, the present technique can make use of the fact that requests and responses sent between the agents are non-blocking, to reduce the overall latency associated with the operation, without necessarily reducing the latency associated with communication with each individual one of the target agents. The present technique thus provides improved performance for the apparatus as a whole.

The fact that this technique allows the overall latency of the operation to be reduced without, necessarily, reducing the latency associated with each of the target agents can be particularly advantageous, since it allows the performance of the apparatus to be improved without requiring significant alterations to be made to the structure of the interconnect. In particular, the present technique only requires the addition of extra storage circuitry to store the latency indications, and extra logic within the coordination agent to allow it to determine the sending order—the communication paths provided by the interconnect do not themselves need to be altered, and nor do the target agents.

In some examples, the coordination agent is configured to determine the sending order such that the request is sent to target agents having a higher latency before the request is sent to target agents having a lower latency. This allows the coordination agent to take into account an expected delay in receiving a response from each target agent, by sending the requests to those target agents for whom the delay is expected to be longer before sending the request to the other target agents. In this way, the overall latency associated with the operation can be reduced, since the requests and responses associated with the greatest latency can be given the most time to complete (e.g. due to an increased overlap between outstanding requests and responses). The inventors realised that this could significantly reduce the overall latency associated with the operation without needing to reduce the individual latencies associated with each target agent, thus leading to an improvement in performance.

The operation performed by the coordination agent may be any operation involving sending requests to a plurality or target agents and receiving responses from the target agents. However, in some examples, the operation comprises a maintenance operation, and the request comprises a request to perform a maintenance action in respect of a respective microarchitectural structure for each of the target agents. Such an operation can be associated with a large latency—particularly if the number of target agents is large—so the present technique can be particularly advantageous when the operation comprises such a maintenance operation.

In some examples, the maintenance operation comprises a cache maintenance operation, the respective microarchitectural structure for each of the target agents comprises a target cache, and the maintenance action comprises one of: invalidating at least one entry in the respective target cache for each of the target agents; and updating data stored in the at least one entry. A cache is a storage structure, and can for example be used to store a subset of the data, instructions, address translations or any other information stored in memory. A cache is typically smaller than memory, thus allowing future requests to access the information stored in the cache to be carried out with reduced latency relative to the time that would be required to access that information in memory. Examples of caches include (but are not limited to): data caches for storing data for access by processing circuitry when executing subsequent load/store instructions; instruction caches for storing instructions to be fetched by the fetch stage of a processor pipeline, for execution by processing circuitry; shared instruction/data caches which store both instructions and data; translation lookaside buffers (TLBs) storing address translation data for use in translating virtual addresses or intermediate physical addresses into physical address, or translating virtual addresses into intermediate physical addresses; and branch prediction storage structures (branch prediction caches) for storing information for use by a branch predictor in making branch predictions. Each of the respective caches may form part of one of the target agents—for example, a CPU or GPU may include one of more data or instruction caches, shared instruction/data caches, TLBs (for example, in a memory management unit (MMU)), or branch prediction caches (for example, in a branch predictor). Alternatively, each respective cache may be accessible to one of the agents, or one of the agents may itself be a cache—for example, one of the agents could be a system cache, shared between multiple other agents coupled to the interconnect.

There may be a large number of target agents, each having a respective target cache, and the cache maintenance operation may be performed to update each of the target caches to invalidate or update any out of date information. By performing the operation in accordance with the present technique, wherein the requests are sent to each of the target agents in the sending order determined by the coordination agent, the overall latency of the cache maintenance operation can be reduced, thus reducing the amount of time during which the respective target caches store out of date information, and allowing any subsequent operation that may not be able to start until the cache maintenance operation has completed to be initiated more quickly.

In some examples, the coordination agent is configured to perform the maintenance operation in response to receiving an input request from a requesting agent coupled to the interconnect. The input request could be an explicit request issued by the requesting agent requesting the coordination agent to perform the maintenance operation, or it could be an implicit request (e.g. a request to perform some other action, which the coordination agent may respond to by performing the requested action and further performing the maintenance operation).

In some examples, the input request comprises a cache coherency request issued by the requesting agent when seeking to access data at a target location in memory, the maintenance operation comprises a cache coherency operation, and the respective microarchitectural structure for each of the target agents comprises a data cache used to store a subset of data accessible in the memory. A cache coherency request may in some instances be an implicit request to perform the maintenance operation. For example, the cache coherency request could be an access request to update some data stored in memory (e.g. a write request issued by the requesting agent in response to executing a write instruction), and the coordination agent may interpret that request as a request to perform a cache coherency operation.

In some examples, the coordination agent comprises snoop control circuitry (e.g. a snoop filter) configured to maintain a record providing an indication of the memory locations whose data is cached in each data cache. The snoop control circuitry may be arranged to select the target agents based on the record and the target location specified for the cache coherency request, the target agents comprising those agents that have respective caches that may store a copy of the data at the target location in memory, and the request issued to each target agent comprises a snoop request. The record maintained by the snoop control circuitry need not necessarily be a completely accurate record—it may be enough for the record to distinguish between "may have a copy" and "does not have a copy", so that snoop requests can be send to those agents that "may have a copy", rather than sending the snoop request to every agent.

When data caches associated with multiple different target agents each store a copy of the same data, snoop control circuitry can be useful to maintain consistency (coherence) between the different data caches. In particular, when the data is updated, the snoop control circuitry can issue requests to cause an entry in each of the data caches storing a copy of the data to either be updated to match the updated data in memory, or to be invalidated.

It can be particularly advantageous to apply the present technique to snoop requests, since reducing the latency associated with the cache coherency operation can make the handling of cache coherency operations more efficient, irrespective of whether any formal response needs to be made to the original requesting agent when the cache coherency operation has completed. Further, in some instances the requesting agent may require a formal response to its request that cannot be provided until the cache coherency operation has been performed, and the present technique can reduce the delay in responding to the request originally issued by the requesting agent. Purely by way of example the requesting agent may be seeking to obtain exclusive access to an item of data, and to store that data in its local cache marked as being exclusively owned, and the response from the coordination circuitry providing that data may be deferred until the cache coherency operation has been completed (in this case invalidating any other cached copies). Thus, by applying the present technique to cache coherency operations, the latency associated with such operations can be reduced and hence the performance of the system as a whole can be even further improved.

While the input request can be an implicit request to perform the maintenance operation, such as a cache coherency request, the request could alternatively be an explicit request to perform the maintenance operation. In some examples, the input request may be issued by the requesting agent in response to the requesting agent executing a maintenance instruction, and hence is explicitly requesting the maintenance operation to be performed. In such examples, the requesting agent may expect a response from the coordination agent once the operation has completed, and so it can be particularly advantageous to reduce the overall latency associated with the operation in order to be able to return the completion response to the requesting agent with reduced latency.

In some examples, the respective microarchitectural structure for each of the target agents that may be subjected to the maintenance action in response to such an explicit request may comprise at least one of: a translation lookaside buffer (TLB); an instruction cache; and a branch prediction storage structure accessible to a branch predictor.

These are all structures which could be updated in response to a requesting agent executing a maintenance instruction, and hence the requesting agent may expect a response from the coordination agent once the maintenance operation is complete. A TLB comprises a cache storing recent address translation data, to allow subsequent translations of the same addresses to be performed with reduced latency. For example, a TLB may store address translation data associated with recent virtual to physical address translations, virtual to intermediate physical address translations or intermediate physical to physical address translations. An instruction cache comprises a cache which stores copies of instructions executed by processing circuitry, allowing the instructions to be fetched more quickly if the same instructions are executed again in future. A branch predictor makes predictions about upcoming branch instructions (e.g. control flow altering instructions); for example, this could include predicting whether a branch is taken or not taken, and/or predicting a branch target address identifying an instruction later in the instruction stream that is to be executed next if the branch is taken. The branch predictor may make predictions based on information stored in a branch prediction storage structure. For example, the branch prediction storage structure may store information indicative of the outcomes of previously encountered branch instructions, for example indicating whether each branch was taken or not taken and/or the branch target address for a given branch instruction.

When updating or invalidating an entry in a TLB, instruction cache or branch prediction storage structure associated with a requesting agent, it can be useful to also update or invalidate corresponding entries in structures associated with other agents coupled to the interconnect, so that the other agents also have access to the most up to date information. Therefore, the requesting agent may issue a request to the coordination agent to perform a maintenance operation to update or invalidate one or more entries in those structures. Thus, the present technique can be applied in this situation to reduce the latency associated with performing the maintenance operation.

In some examples, the latency indication for a given agent is indicative of a round trip time between the request being sent to the given agent and the response being received from the given agent. Thus, determining the sending order in dependence on the latency indication associated with each target agent allows the time to complete the operation as a whole to be reduced.

There are a number of different causes of latency in communication between agents coupled to the interconnect, and a number of different ways of recording the latency. In some examples, the latency indication for the given agent is based on at least one of: a static parameter defined for communication between the given agent and the coordination agent; and a dynamic variable calculated based on current traffic between the given agent and the coordination agent. Static parameters—e.g. parameters which are not based on the current conditions (such as traffic) within the interconnect—can be simpler to implement, since they do not need to be updated frequently. For example, static parameters may be based on the arrangement of the components within the interconnect, and may thus only need to be set once for each agent. On the other hand, dynamic parameters—e.g. parameters based on current usage of the interconnect—may be more difficult to implement since they may require additional logic to record the current traffic on the interconnect. However, using dynamic parameters may lead to a more accurate determination of the latency associated with each agent, and thus may lead to a greater reduction in the overall latency associated with the operation.

The interconnect may take any form, but in some examples, the interconnect comprises a plurality of routing nodes and a plurality of links between the routing nodes, each agent being coupled to one of the routing nodes, and each communication path comprises at least one link between at least two routing nodes. For example, each communication path may take the form of one or more "hops" between routing nodes, depending on the relative positions of the agents in the interconnect.

In some examples, the static parameter comprises a number of links in the communication path between the given agent and the coordination agent. For example, a larger number of links (e.g. a larger number of hops between routing nodes) between the given agent and the coordination agent may indicate a higher latency, and thus taking the number of links into account when determining the sending order can reduce the overall latency of the operation. Moreover, the number of links in the communication path can be a useful measure of latency since it is easy to quantify, and—because the number of links is a static parameter which does not depend on the current traffic on the interconnect—it can be particularly simple to implement as discussed above.

In some examples, each link has an associated latency, and the static parameter comprises an indication of the associated latency of each link in the communication path between the given agent and the coordination agent. In this way, a more accurate indication of the latency associated with the communication path can be provided, for example where not all links exhibit the same latency, thus allowing the overall latency to be even further reduced.

In some examples, the latency indication for a given agent is based on a congestion indication associated with the communication path between the given agent and the coordination agent. The congestion indication could be based on static variables and/or dynamic variables. For example, the congestion indication could be based on one or more dynamic variables such as a current amount of congestion on the communication path between the given agent and the coordination agent—e.g. the current amount of congestion may be based on a number of requests sent by the coordination agent in a period of time prior to performing the operation.

The congestion could also be based on one or more static variables. In some examples the congestion indication is based on an estimated amount of congestion in the communication path between the given agent and the coordination handling agent. In some instances the estimated amount of congestion could be a static indication (e.g. not based on current traffic on the interconnect), and thus may be simpler to implement than dynamic options. However, an estimated congestion may still provide a fairly accurate indication of the latency on a given communication path, because the traffic on an interconnect can be fairly predictable, for example based on the arrangement of the interconnect and the types of agents coupled to the interconnect.

As mentioned earlier, in some examples, the interconnect comprises a plurality of routing nodes and a plurality of links between the routing nodes, each agent being coupled to one of the routing nodes, and each communication path comprising at least one link between at least two routing nodes. In such an arrangement, the estimated amount of congestion may be based on a topology of the interconnect and a position, in the interconnect, of at least one link in the communication path between the given agent and the coordination handling agent. As discussed above, the traffic on an interconnect can be fairly predictable based on the arrangement of the interconnect, and in particular examples the topology (e.g. the shape formed by the routing nodes and links in the interconnect—for example an interconnect could have a mesh, ring or linear topology) of the interconnect can provide a good estimate of where congestion is expected to be the greatest. The topology of the interconnect is typically fixed, so this is a static variable and thus can be particularly easy to implement.

In some examples, the interconnect comprises a mesh network, comprising a rectangular array of routing nodes, wherein the routing nodes comprise crosspoints, and the estimated amount of congestion for a given link is based on a distance between the given link and an edge of the mesh network. As noted above, one possible topology for an interconnect is a mesh, wherein the routing nodes and links form a rectangular shape. In such a topology, it is typically expected that there will be greater congestion on the links towards the centre of the mesh, since these links are typically part of a greater number of different communication paths than links towards the outside of the mesh. Therefore, a good estimate of the congestion on a given link can be provided by determining the distance between that link and the edge of the mesh.

In some examples, the latency indication for a given agent is based on an expected time for the given agent to process the request. The expected time could be based on static and/or dynamic parameters. For example, as a static parameter, certain types of target agent may be expected to take longer to process a request than other types of target agent. As a dynamic parameter, the expected time could be based on a number of pending requests sent to the given agent. However, it should be appreciated that these are merely examples, and any measure of the expected time could be used instead. Moreover, the expected time may further take into account the expected time taken to route the request/response between the coordination node and the given agent.

Particular embodiments will now be described with reference to the figures.

FIG. 1 shows a data processing system 102 comprising a plurality of agents 104, 106, 110 coupled to an interconnect 108; the interconnect 108 is therefore an example of an interconnect to provide communication paths between agents coupled to the interconnect. The agents include request nodes (RN) 104, slave nodes (SN) 106 and home nodes 110. The request nodes 104 (which may also be referred to as master devices) are agents capable of processing data and can send requests (e.g. transactions) to the slave nodes 106; for instance the request nodes 104 could include processing units such as a central processing unit (CPU) or a graphics processing unit (GPU). For example, the requests could include data access requests (e.g. read requests and write requests) to access data stored in memory or address translation requests. The slave nodes 106 (which may also be referred to as completer nodes) are components which operate under the control of the request nodes 104 (e.g. by responding to transactions issued by the request nodes 104).

In particular, the request nodes may issue requests to home nodes (HN) 110 via communication paths 114 between the request nodes 104 and the home nodes 110, and each home node 110 may control a corresponding slave node 106. For example, the slave nodes 106 could include a memory controller for controlling access to memory or another storage structure (e.g. in response to an access request from one of the request nodes 104), a system cache storing copies of data stored in memory, or an input/output controller for controlling an input/output device. It will be appreciated that, while FIG. 1 shows a system 102 including three request nodes 104, two home nodes 110 and two slave nodes 106, this is just an example, and any number of agents 104, 106, and home nodes 110 could be included. Moreover, while the home nodes 110 are shown in FIG. 1 as part of the interconnect 108, it will be appreciated that they may instead be separate (but coupled) to the interconnect 108.

Requests and responses sent between the agents via the communication paths provided by the interconnect may be non-blocking, such that there may be multiple outstanding requests "in flight" (e.g. in transit between the agents) at any given time. A given agent does not, therefore, necessarily have to wait until (for example) a response to a given request has been received before sending the next request.

The communication paths 114 between the request nodes 104 and the home nodes 110 are illustrated in FIG. 1 as direct links between each of the request nodes 104 and each home node 110; however, this is illustrative only. In reality, each communication path may include multiple hops via intermediate routing nodes (not shown), and the exact path taken depends on factors such as the topology of the interconnect.

As mentioned above, the request nodes 104 may send requests to the home nodes 110 to be completed by the slave nodes 106. However, this is just one example of the type of request that may be sent between the agents 104, 106, 110 coupled to the interconnect. For example, one of the agents (a requesting agent) may send an input request to a coordination agent coupled to the interconnect and configured to perform an operation that requires sending a request to each of a plurality of target agents selected for the operation from the agents coupled to the interconnect, and receiving a response from each of the plurality of target agents, the operation being unable to complete until the response has been received from each of the plurality of target agents. For example, the coordination agent could be one of the home nodes 110, and the requesting agent may be one of the request nodes 104.

An example of an input request received by a coordination agent could be a request to perform a maintenance operation to update (e.g. perform a maintenance action in respect of) a respective microarchitectural structure associated with each of a set of target agents. The input request may, in this case, be an explicit request to perform the maintenance operation, and may be sent to the coordination agent in response to the requesting agent executing a maintenance instruction. In a particular example, this could be a TLB invalidate request issued by the request node 104, requesting that one or more entries in a TLB belonging to each of a plurality of target agents (which could include one or more of the request nodes 104 and/or one or more of the slave nodes 106) be invalidated. Alternatively, the respective microarchitectural structure may be some other microarchitectural structure, such as an instruction cache or a branch prediction storage structure accessible to a branch predictor. The coordination agent will issue maintenance requests to each of the target agents and will then receive a response from each of the target agents once the maintenance action in respect of that target agent's respective microarchitectural structure has been performed (e.g., in the case of a TLB invalidate operation, once the identified entry has been invalidated). It will then send a completion response back to the requesting agent once all of the responses have been received. Since the completion response cannot be sent back to the requesting agent until all of the responses have been received, the latency associated with the maintenance operation as a whole may impact the performance of the requesting agent.

Another example of an input request could be an access request issued by a processing unit (such as a CPU or GPU) to write to an identified memory location in memory, or to read data from an identified location in memory. In this case, the access request may be referred to as a cache coherency request (or a coherent cache line request, for example), the coordination agent may be a home node 110 (as shown in FIG. 1), and the home node 110 may be responsive to the input request to perform a cache coherency operation to issue snoop requests to any of the agents (e.g. as identified by a snoop filter accessible to the home node 110) for which a respective cache stores (or may store) a copy of the data stored at the identified memory location. The snoop request is a request to invalidate or update the copy of the data stored in the respective cache, and each of the target agents is configured to send a response to the home node 110 once the corresponding entry in their respective cache has been invalidated or updated (alternatively, the response may indicate that the data is not stored in their respective cache). Once a response has been received from each of the target agents, the cache coherency operation can complete. The home node 110 may in some instances need to wait until the cache coherency operation is complete before responding to the access request. Thus, the greater the latency associated with the overall cache coherency operation, the greater the latency associated with the access request and, as a result, the greater the impact on the performance of the requesting agent.

In each of these examples, the coordination agent (which could be the home node 110 or another agent) performs an operation which involves sending a request to each of a set of target agents selected from those agents 104, 106 coupled to the interconnect 108, and receiving a response from each of the target agents. The operation is therefore unable to complete until all of the responses have been received. When performing such an operation, there is a latency associated with each request and each response sent between the coordination agent 110 and each target agent. Since the operation cannot complete until all of the responses are received, this means that there is also a latency associated with the operation as a whole that is dependent on the latencies of each of the requests and responses sent and received as part of the operation. As noted above, the latency of the operation can have an impact on the performance of the agents coupled to the interconnect, and thus it would be advantageous to reduce this latency.

Each of the coordination agents 110 of the present technique thus includes latency indication storage 112, which stores a latency indication for each agent that the coordination agent 110 can communicate with. The latency indication storage 112 is therefore an example of storage circuitry accessible to the coordination agent and configured to store, for each agent that the coordination agent may communicate with via the interconnect, a latency indication for communication between that agent and the coordination agent.

The latency indication for each agent is indicative of the time between a request being sent by the coordination agent 110 to that agent and a response being received from that agent. The latency indication may be based on any of a number of different factors, as will be discussed in more detail below, and the latency indication storage 112 may be part of the coordination agent 110 as shown in FIG. 1, but it may also be a separate storage structure accessible to the coordination agent 110. Moreover, while FIG. 1 illustrates each coordination agent 110 having a separate latency indication storage 112, it is also possible for multiple coordination agents 110 to share a single latency indication storage 112.

Prior to performing the operation (whether this is in response to an explicit request to perform the operation received from one of the request nodes 104, or in response to detecting some other request such as an access request that necessitates a cache coherency operation), the coordination agent 110 is configured to determine a sending order in which to send its request to each of the target agents. In particular, the coordination agent 110 determines the sending order in dependence on the latency indications stored in the latency indication storage 112 for each of the target agents. This allows the sending order to be selected to reduce the overall latency associated with the operation. For example, the sending order may be determined such that the request is sent to the target agents having a higher latency before being sent to target agents having a lower latency, thus lowering the latency overall by increasing the overlap between outstanding requests and responses.

Figure 2:
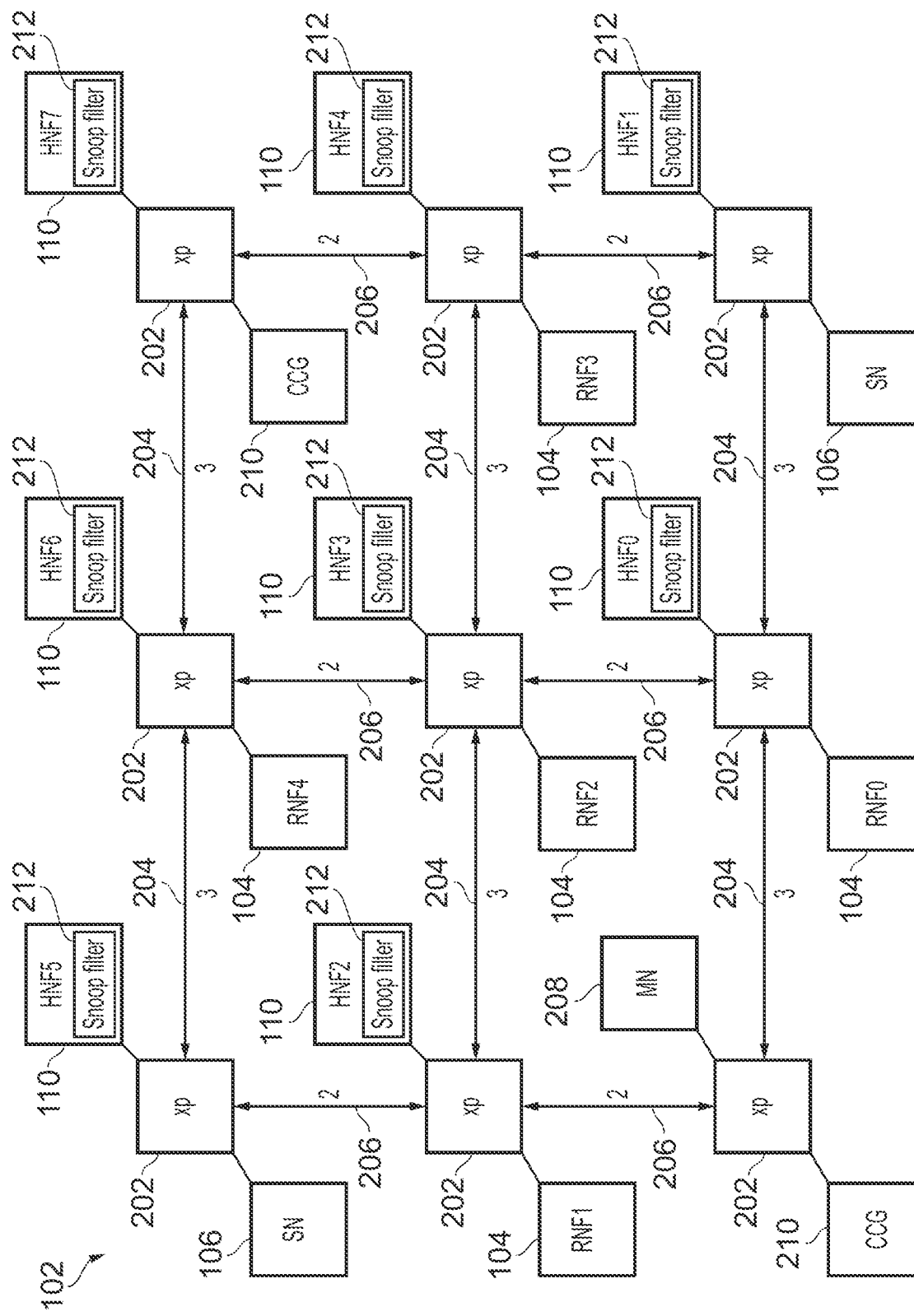
FIG. 2 schematically illustrates an example of a system comprising a mesh network.

FIG. 2 shows an example of the system 102 in which the interconnect 110 comprises a mesh network. In particular, FIG. 2 shows an example of a mesh network made up of a rectangular array of crosspoints (XPs) 202, coupled to one another by links 204, 206 (also sometimes referred to as Mesh Credited Slices (MCS)). The crosspoints 202 are examples of routing nodes and, in this particular example, the mesh comprises a three-by-three array of crosspoints 202. However, it will be appreciated that other arrangements are also possible.

A number of agents are shown coupled to the interconnect, including home nodes 110, slave nodes 106, request nodes 104, chip-to-chip gateways (CCGs) 210, and a miscellaneous node (MN) 208.

Each of the agents is coupled to the mesh at one of the XPs 202, and messages may be transmitted between agents via the XPs 202 and the links 204, 206 between the XPs; therefore, a communication path between two agents comprises one or more XPs 202 and may also include one or more links 204, 206 between the XPs 202, depending on the positions of the two agents in the network and the route taken between them. Each of the links 204, 206 has an associated latency, indicative of the amount of time it takes for a message (e.g. a request or response) to traverse that particular link; in this specific example, it is assumed for purposes of discussion that all of the horizontal links 204 have a latency of 3 cycles, and all of the vertical links 206 have a latency of 2 cycles. However, in a more general case the latency associated with each link may depend on any number of factors including, for example, the length of the link, the position of the link within the interconnect, or the traffic on that link.

Moreover, there may also be other sources of latency associated with communication between the agents 104, 106, 110, 208, 210 coupled to the interconnect. For example, the latency associated with communication between a given pair of agents may be dependent on: a number of links 204, 206 in the communication path between the two agents (e.g. a greater number of links 204, 206 (e.g. a longer chain of links) may indicate a greater latency); a position of each of the links 204, 206 of the communication path within the interconnect (e.g. links 204, 206 closer to the centre of the mesh network may be associated with a greater latency due to the increased traffic through the centre of the interconnect); and the type of each of the agents (e.g. some agents—such as a CCG—may be expected to take longer to process a request than other agents). Each coordination agent (e.g. the home nodes 110 and the MN 208) has access to latency indication storage as discussed above. The latency indication stored in the latency indication storage may be based on any one of the factors discussed above, or any combination thereof.

In FIG. 2, the request nodes 104 are fully coherent request nodes (RN-Fs) 104, each including a hardware coherent cache and permitted to issue any type of transaction including access requests to access data stored in memory. However, it will be appreciated that other types of request nodes 104 may also be included. The CCGs 210 are linking agents which facilitate communication between the interconnect and a further interconnect on another chip.

As described above, the home nodes 110 are examples of coordination agents. The home nodes 110 in FIG. 2 each comprise a snoop filter 212 which maintains a record of which of the caches of the RN-Fs 104 may store copies of which data in memory. The home nodes 110 therefore monitor access requests issued by the request nodes 104 to identify any access requests causing an update to data that may be stored in the cache of at least one other request node 104. If the snoop filter detects such an access request, it responds by performing a cache coherency operation as described above. Which home node is used to review any particular access request may for example depend on the address specified by that access requests, with for example different home nodes being used for different address ranges.

The MN 208 is a further example of a coordination agent, and is responsible for sending maintenance requests such as TLB and instruction cache maintenance requests (also sometimes referred to as distributed virtual memory operations DVMOps) to the request nodes 104 and the CCGs 210. The MN 208 may perform a maintenance operation as described above, to send maintenance requests to a subset (or all) of the request nodes 104 and CCGs 210 (the target agents for the operation) in response to receiving a request from a requesting agent (e.g. one of the request nodes 104).

As discussed above, there is a latency associated with each of the links 204, 206 in the mesh network of FIG. 2, and these latencies may contribute to the overall latency of an operation performed by one of the coordination agents. FIGS. 3 and 4 give examples of how the latencies associated with each link 204, 206 may contribute to the overall latency of a maintenance operation carried out by the MN 208. In particular, FIG. 3 gives an example of how the latencies of the links may contribute to the overall latency of the operation when the latency indications stored in the latency indication storage 112 are not taken into account (e.g. when not applying the present technique), while FIG. 4 gives an example where the latency indications have been taken into account.

In the example shown in FIG. 3, the requests are sent to the target agents (in this example, the target agents are request nodes RNF0, RNF1, RNF2, RNF3 and RNF4) in a logical order based on the numbering of the target agents in the diagram (i.e. in the order RNF0-RNF1-RNF2-RNF3-RNF4). The left-most (first) column indicates the number of cycles since the start of the operation (in this case, the operation is considered to start when the first request is generated by the MN 208), the second column shows the operation of the MN 208, and the third and fourth columns show the operation of the target agents.

The timings shown in the table of FIG. 3 are based on the latency associated with the links 204, 206 between the XPs in FIG. 2. For example, it takes req1 two cycles to travel from the MN 208 to RNF1, because the shortest communication path between MN 208 and RNF1 comprises one vertical link 206. On the other hand, it takes req3 8 cycles to travel to RNF3, because the shortest communication path between MN 208 and RNF3 comprises two horizontal links 294 and one vertical link 206. The latency associated with sending a request to each of the target agents for the operation in FIG. 3 is therefore taken to be:
- 3 cycles for req0;
- 2 cycles for req1 (as discussed above);
- 5 cycles for req2;
- 8 cycles req3 (as discussed above); and
- 7 cycles for req4.

Each response then takes the same amount of time to travel back to the MN 208 as the corresponding request took to reach the target agent. In this example, for sake of illustration, it is assumed that each request node responds to the request in the cycle after the request is received. Hence, in this relatively simple example, as shown in FIG. 3, it takes 20 cycles for all of the responses to be received by the MN 208, and thus takes 21 cycles for the operation to complete. It will be appreciated that there may also be other causes of latency (as discussed above); however, this example is merely intended to be illustrative, to give an indication of the amount of latency that can be expected when the latency indications stored in the latency indication storage are not taken into account.

It would be advantageous to reduce the overall latency associated with the maintenance operation. While it may be possible to do this by, for example, redesigning the interconnect to reduce the latencies associated with each of the links, the inventors of the present technique realised that a significant reduction in latency could be achieved by adjusting the order in which the requests are sent by the MN 208. In particular, the present technique involves the coordination node (in this case the MN 208, but in other examples it could be one of the home nodes 110) determining a sending order in which to send the requests, based on a latency indication for each of the target agents.

FIG. 4 gives an example where a sending order has been determined in this way. The sending order is determined based on the latency indications stored in the latency indication storage for each of the target agents; in this particular example, the latency indication for each target agent is based on the latency of each link in the communication path between that target agent and the MN 208. Accordingly, the sending order in this example is determined such that the request for which the latency is expected to be the highest (req3) is sent first, and the request for which the latency is expected to be lowest (req1) is sent last. In particular, the requests are sent in the following order in the example:
1. req3 to RNF3 (8 cycles of latency each way);
2. req4 to RNF4 (7 cycles of latency each way);
3. req2 to RNF2 (5 cycles of latency each way);
4. req0 to RNF0 (3 cycles of latency each way);
5. req1 to RNF1 (2 cycles of latency each way).

As shown in FIG. 4, it takes only 17 cycles for all of the responses to be received when the requests are sent in this sending order, and the operation is thus able to complete after 18 cycles (compared to 21 cycles for the example in FIG. 3). Therefore, by determining the sending order in dependence on a latency indication for each target agent, the overall latency associated with the operation has been reduced by 3 cycles.

Moreover, the example in FIG. 4 only takes into account the latency of each link in the mesh network. The overall latency of the operation could be even further reduced by taking into account a greater number of factors which affect the latency associated with communicating with each target agent. However, it will be appreciated that even just considering one factor (as in FIG. 4), a significant reduction in latency can be achieved.

Figure 5:
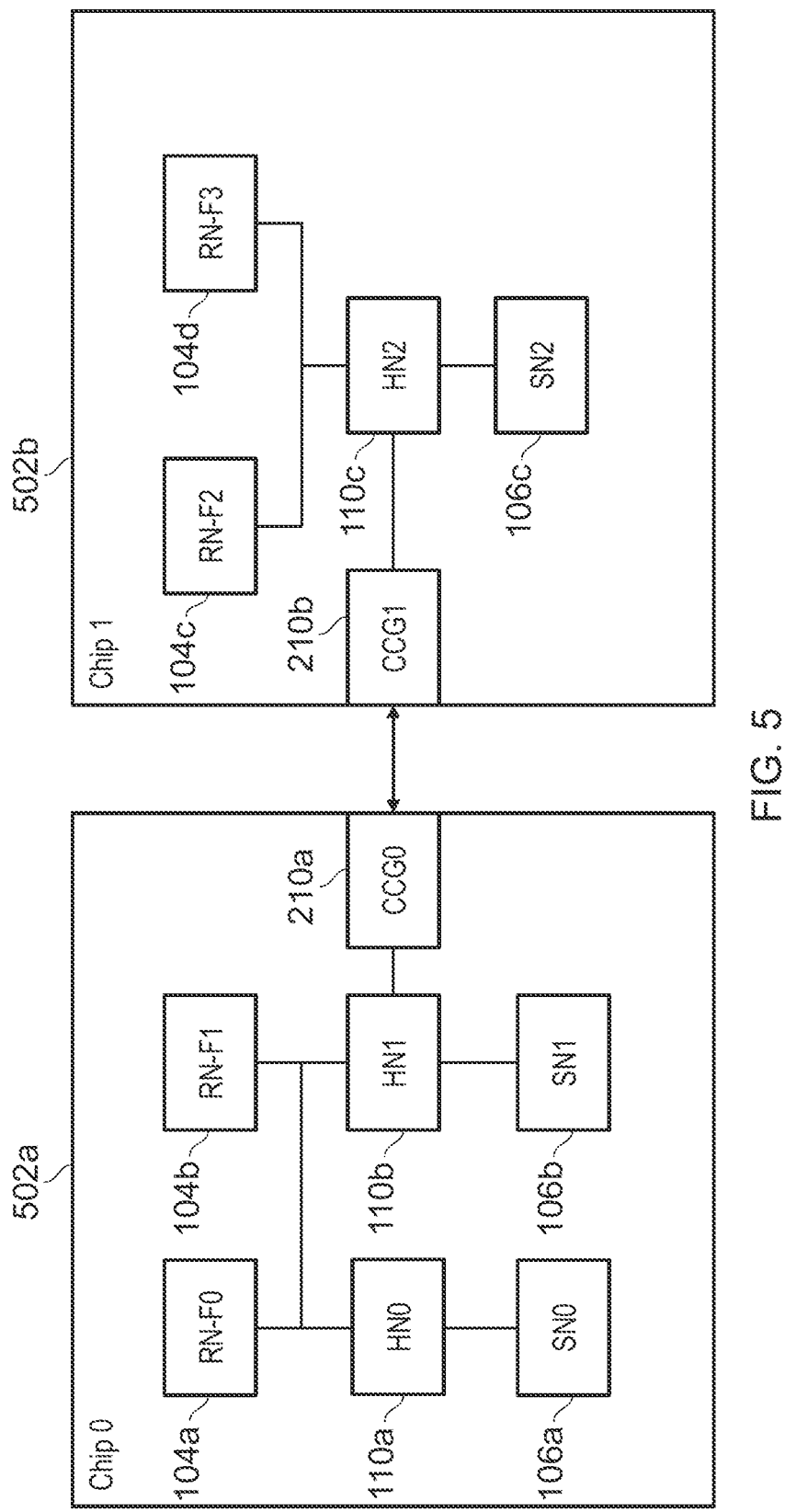
FIG. 5 schematically illustrates an example of communication between interconnects on separate chips.

As discussed above, one type of agent which may be coupled to the interconnect is a chip-to-chip gateway (CCG) 210, which facilitates communication between chips. An example of use of a CCG 210 to communicate between two chips 502 is shown in FIG. 5. FIG. 5 shows two chips—Chip 0 502a and Chip 1 502a—in communication via a pair of CCGs 210a and 210b. Chip 0 502a has two home nodes 110a, 110b, two slave nodes 106a, 106b, two request nodes 104a, 104b, and one CCG 210a. Chip 1 has one home node 110c, one slave node 106c, two request nodes 104c, 104d, and one CCG 210b. Each of the chips 502 may also comprise an MN 208 (not shown), and it will be appreciated that the agents on each chip 502 are each coupled to an interconnect (also not shown) and communicate with one another via the interconnect.

As described above, each of the home nodes 110 may have access to a snoop filter, and may be responsive to receiving a cache coherency request from one of the request nodes 104 to perform a cache coherency operation, acting as a coordination agent. For example, HN0 110a may be responsive to an access request issued by RN-F0 104a to perform a cache coherency operation to send a snoop request to each of the RNs 104 which has a cache storing a copy of the data targeted by the access request. For example, if HN0 110a determines that a cache associated with RN-F1 104b may store a copy of the data, HN0 110a may send a snoop request to RN-F1 104b, which then sends a response back to HN0 110a.

In addition, HN0 110a may also send the snoop request to CCG0 210a. CCG0 210a may then send the snoop request to CCG1 210b, which passes the snoop request on to HN2 110c. In this case, CCG0 210a acts as one of the target agents for the cache coherency operation. HN2 110c then begins a cache coherency operation of its own, in respect of the RNs 104 on Chip 1 502b. Once HN2 110c has sent a coherency request to, and received a response from, each of the RNs 104 on Chip 1 502b which it has determined may store a copy of the data, it sends a response back to CCG1 210b, which communicates with CCG0 210a, which in turn sends a response back to HN0 110a.

The latency associated with communication between HN0 110a and CCG 210a may be greater than the latency associated with communication between HN0 110a and RN-F0 104a or RN-F1 104b, since HN2 110c on Chip 1

502b needs to perform its own cache coherency operation in response to receiving the request from HN0 110a. Therefore, in some examples, the latency indication stored in the latency indication storage for each agent may be based, at least in part, on the type of the agent—for example, it may be assumed that the latency associated with a CCG 210 is greater than the latency associated with an RN 104.

The present technique applies to any operation performed by a coordination node that includes sending a request to a plurality of target agents and receiving a response from each of the target agents. For example, the operation could be a cache coherency operation, in which case the request sent to each target agent comprises a request to perform a cache maintenance operation in respect of at least one entry of one or more data caches for each of the target agents. In another example, the operation could be a maintenance operation triggered by a maintenance instruction executed by a requesting agent, and each request may be a request to perform a maintenance action in respect of at least one microarchitectural structure for each target agent; for example, the target microarchitectural structure could be a TLB, an instruction cache, or a branch prediction storage structure associated with a branch prediction structure.

Figure 6:
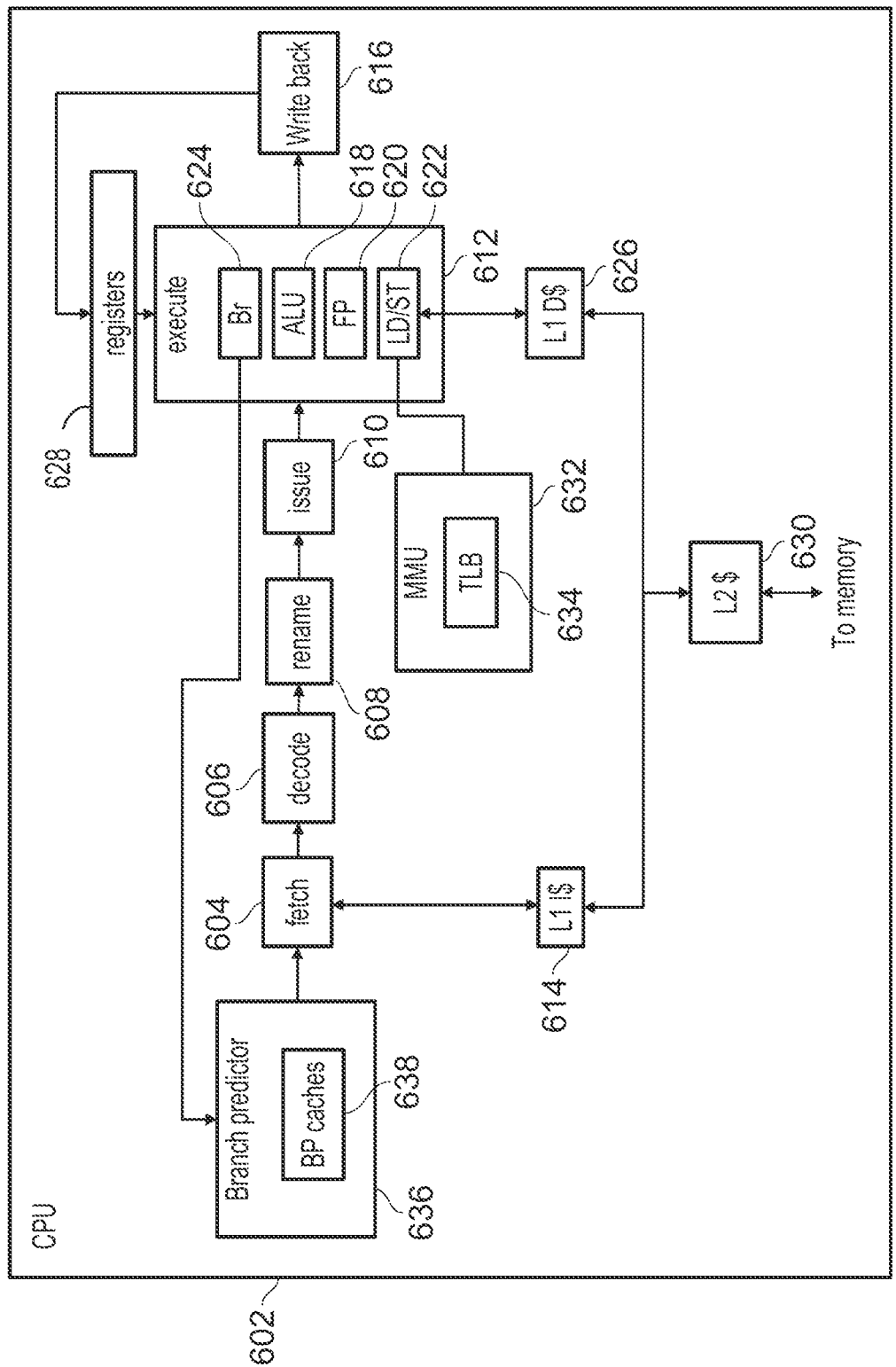
FIG. 6 schematically illustrates an example of some of the components of a CPU.

FIG. 6 schematically illustrates an example of a CPU 602, and demonstrates examples of each of these microarchitectural structures. The CPU 602 of FIG. 6 comprises a processor pipeline made up of a fetch stage 604, a decode stage 606, a rename stage 608, an issue stage 610, an execute stage 612, and a write back stage 616. Fetch stage 604 fetches instructions from a level 1 instruction cache 614, which stores copies of instructions stored in memory, and passes the fetched instructions to the decoder 606. The decoder 606 decodes the fetched instructions to generate control signals for controlling the execute stage 612 to perform data processing operations. The rename stage 608 remaps architectural registers referenced by instructions onto microarchitectural registers provided in the apparatus, and the issue stage 610 includes an issue queue to buffer decoded instructions for execution, and selection circuitry to select the next decoded instruction to be issued to the execute stage 612. In-order processors may not include a rename stage 608 or an issue stage 610.

The execute stage 612 is configured to execute decoded instructions, and the writeback stage 616 writes the results of instructions to the register file 628. The execute stage 612 shown in FIG. 6 comprises multiple execution units, including an arithmetic logic unit (ALU) 618, a floating point (FP) execution unit 620, a load/store (LD/ST) unit 622, and a branch execution unit 624. The ALU 618 executes arithmetic operations and the FP unit 620 executes floating point operations. The load/store unit 622 executes load and store operations, which involve loading data from the level one data cache 626 into the register file 628, or storing data from the register file 628 to memory. When executing a load instruction, if the requested data is not available in the level one data cache 626, then it may instead be fetched from the level two cache 630 into the level one data cache 626. If the data also is not available in the level two cache 630, the load/store unit may issue a coherency request to snoop control circuitry on the interconnect, requesting a copy of the data to be retrieved from memory (or a copy held in another agent's cache) for storage in the register 628 (at which point a cache line of data including the requested data will typically be stored in the level one data cache 626).

Accesses to the memory system (including the level one data cache 626 and level two cache 630) by the load/store unit 622 are controlled by a memory management unit (MMU) 632. The MMU 632 comprises a translation lookaside buffer (TLB) 634, which is a dedicated cache storing copies of address translations—used to translate between virtual addresses and physical addresses—stored in translation tables in memory.

The branch execution unit 624 evaluates branch instructions, and returns information about the results of these instructions to a branch predictor 636, which may use the results to make more accurate branch predictions in the future. In particular, the branch predictor 636 shown in FIG. 6 comprises one or more branch predictor caches 638, which store information for use by the branch predictor 636 in making branch predictions. The branch predictor caches 638 are an example of a branch prediction storage structure, and the branch predictor caches 638, the TLB 634, the level one instruction cache 614 and the shared level two cache 630 are all examples of microarchitectural structures which may be updated in response to execution of a maintenance instruction.

The memory system in the CPU 602 of FIG. 6 takes the form of a memory hierarchy, with at least two cache levels between the memory and the processor pipeline. The instruction cache 614 stores instructions to be fetched by the fetch circuitry, and the level one data cache 626 stores a subset of the data stored in memory, allowing the load/store unit 622 to access that data with reduced latency. A level two cache 630 is also provided, and this is shared between instructions and data. The level two cache 630 is typically larger than either of the level one caches 614, 626, and accesses to the level two cache 630 typically incur a higher latency than accesses to the level one caches 614, 626. However, the latency associated with accessing the level two cache 630 is still typically lower than the latency associated with accessing memory. Moreover, although only two levels of cache are shown in FIG. 6, it will be appreciated that this is just one example, and any number of cache layers could be provided between the processor pipeline and memory. For example, a system cache could be provided on the interconnect, between the CPU 602 and memory. The level one data cache 626 and the shared level two cache 630 are examples of data caches which may be targeted by snoop requests sent as part of a cache coherency operation.

Figure 7:
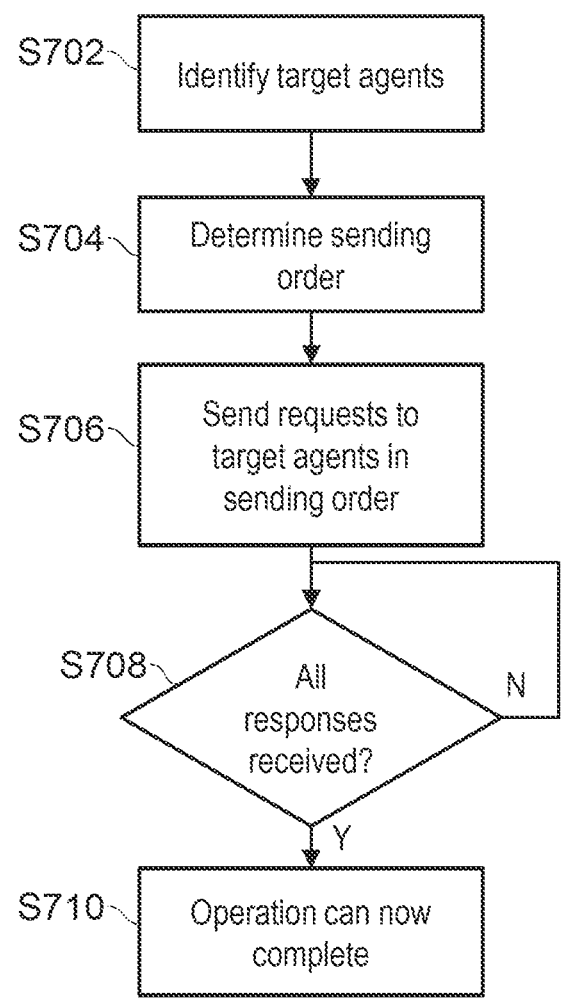
FIG. 7 is a flow diagram showing an example of a method of performing an operation involving sending requests to a plurality of target agents and receiving responses from the plurality of target agents.

FIG. 7 is a flow diagram showing an example of a method carried out by a coordination agent in accordance with the present technique. The method begins with a step S702 of identifying the target agents for the operation. A sending order is then determined in step S704 in dependence in a latency indication associated with communication between the coordination agent and each of the target agents, and a request is sent to each of the target agents in the sending order in step S706. The coordination agent then waits S708 until a response has been received from each of the target agents, before the operation can complete in a step S710.

Figure 8:
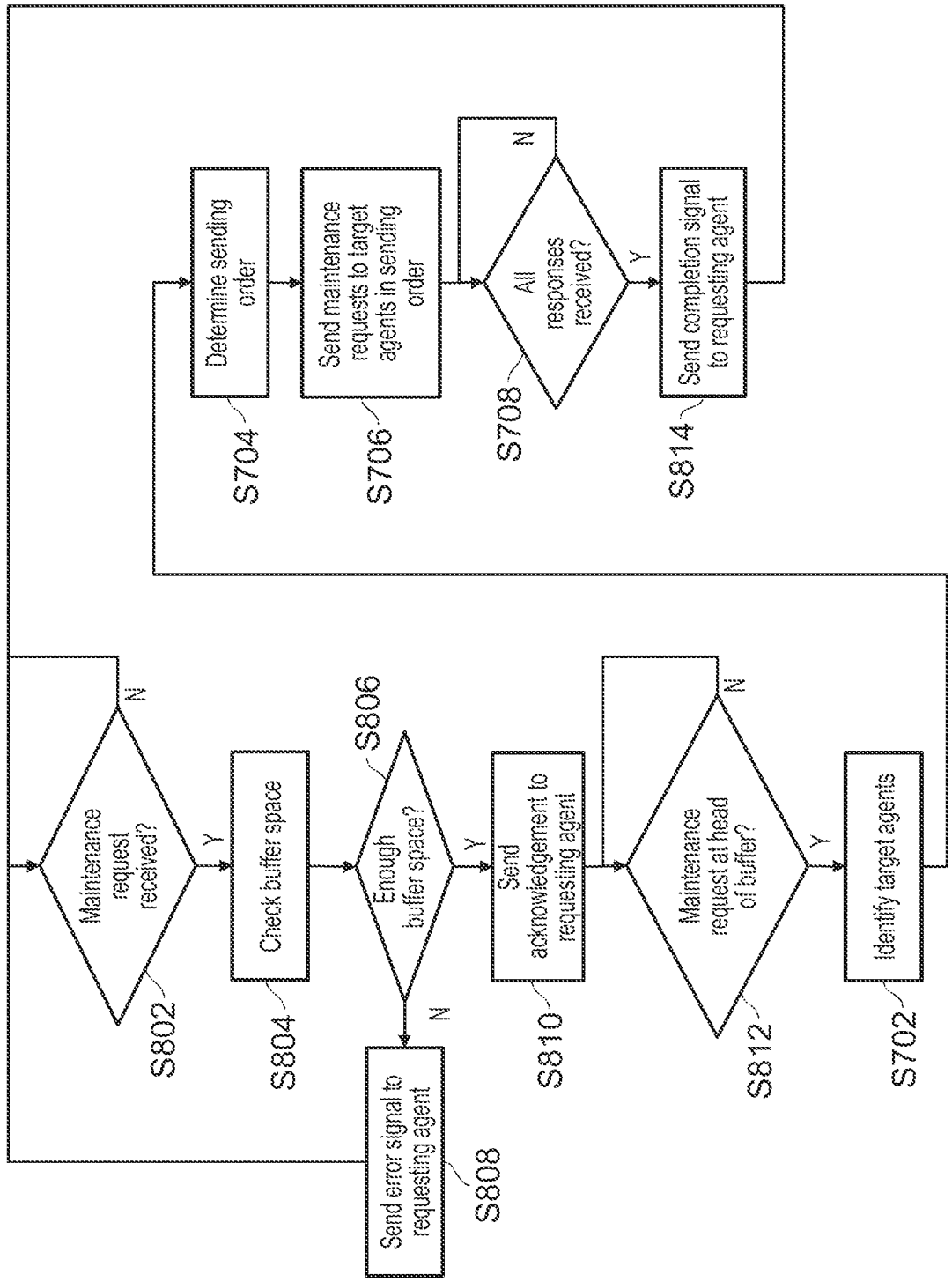
FIG. 8 is a flow diagram showing a method of performing a maintenance operation in response to receiving a maintenance request.
Figure 9:
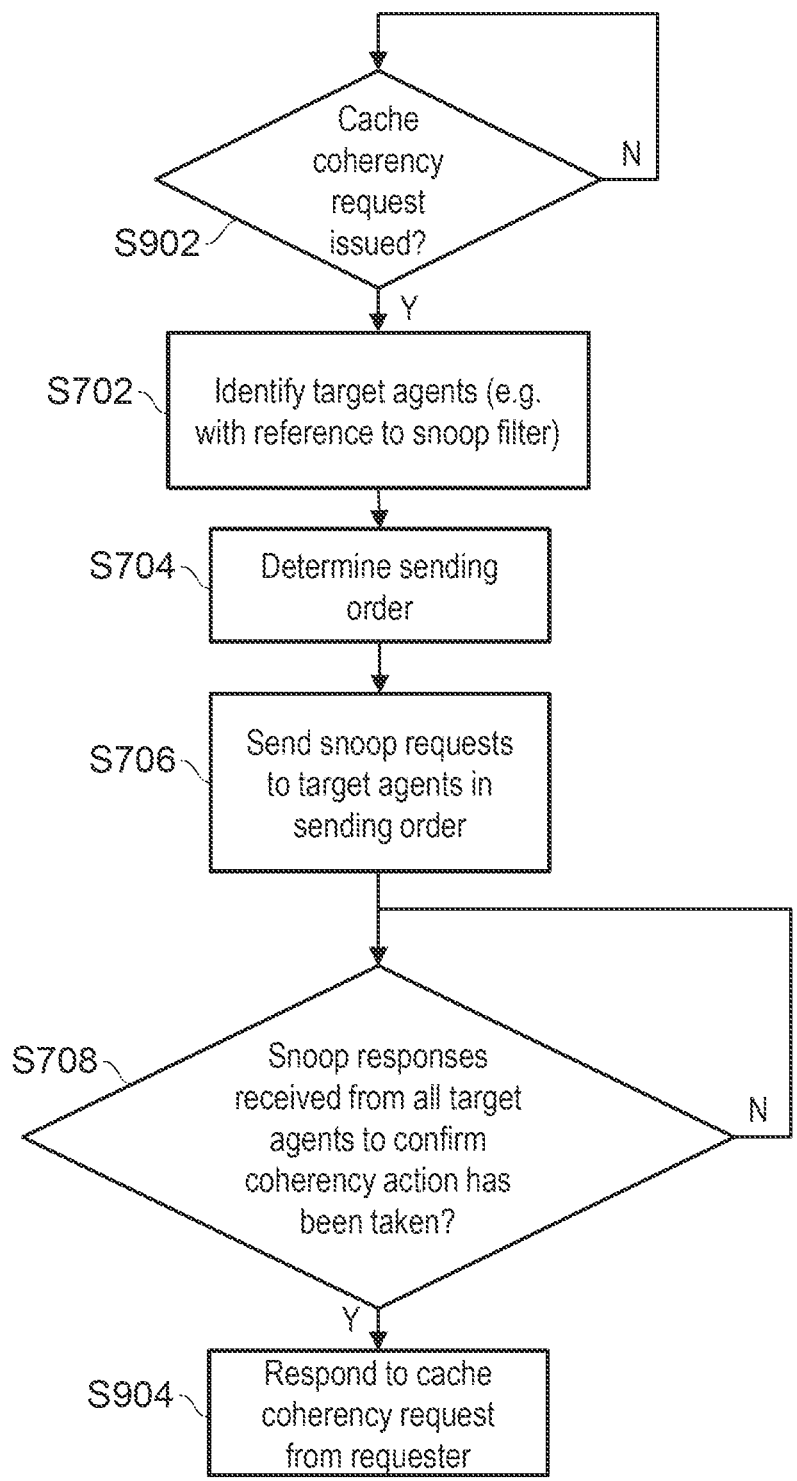
FIG. 9 is a flow diagram showing a method of performing a cache coherency operation in response to a cache coherency request being issued.

Particular examples of operations that may be performed by the coordination agent are shown in FIGS. 8 and 9. FIG. 8 shows an example of a maintenance operation that may be performed by the coordination agent. In particular, the method of FIG. 8 includes a step S802 of determining whether a maintenance request has been received from a requesting agent. When a request has been received, the coordination agent checks S804 how much buffer space it has available, and determines S806 whether there is enough buffer space available to store the received maintenance request. If there is not enough buffer space, an error signal is sent S808 to the requesting agent, whereas if there is enough buffer space, an acknowledgement is sent S810 to the requesting agent. The coordination agent then waits S812 until the maintenance request reaches the head of the buffer before performing the method of FIG. 7. Once all responses have been received from all of the target agents, the coordination agent sends S814 a completion signal to the requesting agent, to indicate that the maintenance operation has been performed.

It should be appreciated that the method shown in FIG. 8 is just one example of a method of performing a maintenance operation, and variations on this method can also be used. For example, steps S802 to S808 may not be necessary in all data processing systems.

Turning now to FIG. 9, this figure shows an example of a cache coherency operation performed by a coordination agent. The method involves a step S902 of determining whether a cache coherency request (e.g. a write or read request to a location in memory storing data which is cached in data caches accessible to one or more of the other agents) has been issued by a requesting agent. Once a cache coherency request is received, the coordination agent performs the method of FIG. 7. In particular, the step S702 of identifying the target agents for the operation is performed with reference to, for example, a snoop filter, and the requests sent to the target agents in step S706 are snoop requests. Once snoop responses have been received S708 from all of the target agents indicating that the requested cache coherency action (e.g. invalidating or updating one or more entries in a respective cache for each target agent) has been taken, the coordination agent can respond S904 to the cache coherency request. For example, the coordination agent may respond by passing the data access request on to a memory controller in the example of a write request, or a read request for data that has not been located in any of the snooped caches. It may also send a response to the requesting agent (for example to provide read data obtained via the snoop operation, to identify that the requesting agent now has ownership of the data in a particular state (e.g. it is the exclusive owner, and hence is the only agent that can currently cache that data), etc.

Hence, in both the maintenance operation example in FIG. 8 and the cache coherency example in FIG. 9, the operation cannot complete until responses have been received from all of the target agents identified for the operation. This means that there is an overall latency associated with the operation, which is dependent on the latency associated with communication between the coordination agent and each of the target agents. However, the inventors realised that by determining a sending order in dependence on a latency indication for each of the target agents, the overall latency of the operation could be reduced.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
an interconnect to provide communication paths between agents coupled to the interconnect;
a coordination agent coupled to the interconnect and configured to perform an operation that requires sending, as a response to a single input request received from a requesting agent coupled to the interconnect, a request to each of a plurality of target agents selected for the operation from the agents coupled to the interconnect, and receiving a response from each of the plurality of target agents, the operation being unable to complete until the response has been received from each of the plurality of target agents; and
storage circuitry accessible to the coordination agent and configured to store, for each agent that the coordination agent may communicate with via the interconnect, a latency indication for communication between that agent and the coordination agent;
wherein:
the coordination agent is configured, prior to performing the operation, to determine a sending order in which to send the request to each of the plurality of target agents, the sending order being determined in dependence on the latency indication for each of the plurality of target agents;
the operation comprises a maintenance operation, and the request comprises a request to perform a maintenance action in respect of a respective microarchitectural structure for each of the target agents; and
the maintenance operation comprises a cache maintenance operation, the respective microarchitectural structure for each of the target agents comprises a target cache, and the maintenance action comprises one of:
invalidating at least one entry in the respective target cache for each of the target agents; and
updating data stored in the at least one entry.

2. The apparatus of claim 1, wherein
the coordination agent is configured to determine the sending order such that the request is sent to target agents having a higher latency before the request is sent to target agents having a lower latency.

3. An apparatus comprising:
an interconnect to provide communication paths between agents coupled to the interconnect;
a coordination agent coupled to the interconnect and configured to perform an operation that requires sending, as a response to a single input request received from a requesting agent coupled to the interconnect, a request to each of a plurality of target agents selected for the operation from the agents coupled to the interconnect, and receiving a response from each of the plurality of target agents, the operation being unable to complete until the response has been received from each of the plurality of target agents; and
storage circuitry accessible to the coordination agent and configured to store, for each agent that the coordination agent may communicate with via the interconnect, a latency indication for communication between that agent and the coordination agent;
wherein:
the coordination agent is configured, prior to performing the operation, to determine a sending order in which to send the request to each of the plurality of target agents, the sending order being determined in dependence on the latency indication for each of the plurality of target agents;

the operation comprises a maintenance operation, and the request comprises a request to perform a maintenance action in respect of a respective microarchitectural structure for each of the target agents;

the input request comprises a cache coherency request issued by the requesting agent when seeking to access data at a target location in memory;

the maintenance operation comprises a cache coherency operation; and the respective microarchitectural structure for each of the target agents comprises a data cache used to store a subset of data accessible in the memory.

4. The apparatus of claim 3, wherein:

the coordination agent comprises snoop control circuitry configured to maintain a record providing an indication of the memory locations whose data is cached in each data cache;

the snoop control circuitry is arranged to select the target agents based on the record and the target location specified for the cache coherency request, the target agents comprising those agents that have respective caches that may store a copy of the data at the target location in memory; and the request issued to each target agent comprises a snoop request.

5. The apparatus of claim 1, wherein the input request is issued by the requesting agent in response to the requesting agent executing a maintenance instruction.

6. The apparatus of claim 5, wherein the respective target cache for each of the target agents comprises at least one of:
 a translation lookaside buffer;
 an instruction cache; and
 a branch prediction storage structure accessible to a branch predictor.

7. The apparatus of claim 1, wherein:

the latency indication for a given agent is indicative of a round trip time between the request being sent to the given agent and the response being received from the given agent.

8. The apparatus of claim 7, wherein the latency indication for the given agent is based on at least one of:
 a static parameter defined for communication between the given agent and the coordination agent; and
 a dynamic variable calculated based on current traffic between the given agent and the coordination agent.

9. The apparatus of claim 8, wherein:

the interconnect comprises a plurality of routing nodes and a plurality of links between the routing nodes, each agent being coupled to one of the routing nodes; and each communication path comprises at least one link between at least two routing nodes.

10. The apparatus of claim 9, wherein the static parameter comprises a number of links in the communication path between the given agent and the coordination agent.

11. The apparatus of claim 9, wherein
each link has an associated latency; and
the static parameter comprises an indication of the associated latency of each link in the communication path between the given agent and the coordination agent.

12. The apparatus of claim 8, wherein the latency indication for a given agent is based on a congestion indication associated with the communication path between the given agent and the coordination agent.

13. The apparatus of claim 12, wherein:

the congestion indication is based on an estimated amount of congestion in the communication path between the given agent and the coordination handling agent.

14. The apparatus of claim 13, wherein the interconnect comprises a plurality of routing nodes and a plurality of links between the routing nodes, each agent being coupled to one of the routing nodes, and each communication path comprising at least one link between at least two routing nodes; and the estimated amount of congestion is based on a topology of the interconnect and a position, in the interconnect, of at least one link in the communication path between the given agent and the coordination handling agent.

15. The apparatus of claim 14, wherein:

the interconnect comprises a mesh network, comprising a rectangular array of routing nodes, wherein the routing nodes comprise crosspoints; and the estimated amount of congestion for a given link is based on a distance between the given link and an edge of the mesh network.

16. The apparatus of claim 8, wherein:

the latency indication for a given agent is based on an expected time for the given agent to process the request.

17. A method comprising:

performing an operation that requires a coordination agent to send, as a response to a single input request received from a requesting agent coupled to an interconnect, a request to each of a plurality of target agents selected for the operation from agents coupled to the interconnect, and receive a response from each of the plurality of target agents, the operation being unable to complete until the response has been received from each of the plurality of target agents, and the interconnect providing communication paths between the agents coupled to the interconnect;

storing, for each agent that the coordination agent may communicate with via the interconnect, a latency indication for communication between that agent and the coordination agent; and prior to performing the operation, determining a sending order in which to send the request to each of the plurality of target agents, the sending order being determined in dependence on the latency indication for each of the plurality of target agents;

wherein:

the operation comprises a maintenance operation, and the request comprises a request to perform a maintenance action in respect of a respective microarchitectural structure for each of the target agents; and the maintenance operation comprises a cache maintenance operation, the respective microarchitectural structure for each of the target agents comprises a target cache, and the maintenance action comprises one of:
 invalidating at least one entry in the respective target cache for each of the target agents; and
 updating data stored in the at least one entry.

* * * * *